US006840033B2

(12) United States Patent
Adams

(10) Patent No.: US 6,840,033 B2
(45) Date of Patent: Jan. 11, 2005

(54) COMBUSTION CHAMBER SYSTEM

(75) Inventor: Joseph S. Adams, 481 Beaver Point Road, Salt Spring Island, British Columbia (CA)

(73) Assignees: Joseph S. Adams, British Columbia (CA); Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/356,880

(22) Filed: Feb. 3, 2003

(65) Prior Publication Data

US 2003/0110758 A1 Jun. 19, 2003

Related U.S. Application Data

(63) Continuation of application No. 10/050,836, filed on Jan. 16, 2002, now abandoned, which is a continuation-in-part of application No. 09/813,058, filed on Mar. 20, 2001, now abandoned, and a continuation-in-part of application No. 10/050,416, filed on Jan. 16, 2002, now abandoned.

(51) Int. Cl.[7] .................................................. F02C 5/00
(52) U.S. Cl. ......................................... 60/39.6; 123/281
(58) Field of Search ........................... 60/39.6; 123/281, 123/282, 283, 284, 285

(56) References Cited

U.S. PATENT DOCUMENTS

| | | | | |
|---|---|---|---|---|
| 1,406,877 | A | 2/1922 | Lemaire | 123/256 |
| 1,422,794 | A | 7/1922 | Smith | 123/143 R |
| 1,450,691 | A | 4/1923 | Lowe | 123/255 |
| 1,787,326 | A | 12/1930 | Sanders | 123/48 D |
| 2,752,907 | A | 7/1956 | Bodine, Jr. | 123/260 |
| 4,149,495 | A | 4/1979 | Miura | 123/32 SP |
| 4,218,888 | A | 8/1980 | Jayne | 60/632 |
| 4,292,935 | A | 10/1981 | Wagner | 123/285 |
| 4,294,208 | A | 10/1981 | Wagner | 123/285 |
| 4,365,471 | A | 12/1982 | Adams | 60/39.76 |
| 4,401,072 | A | 8/1983 | Ito et al. | 123/292 |
| 4,404,938 | A | 9/1983 | Nikolic | 123/256 |
| 4,510,748 | A | 4/1985 | Adams | 60/39.02 |
| 4,665,868 | A | 5/1987 | Adams | 123/46 SC |
| 4,712,379 | A | 12/1987 | Adams et al. | 60/632 |
| 4,759,318 | A | 7/1988 | Adams | 123/46.5 C |
| 4,773,581 | A | 9/1988 | Ohtsu et al. | 227/10 |
| 4,905,634 | A | 3/1990 | Veldman | 123/46 SC |
| 4,913,331 | A | 4/1990 | Utsumi et al. | 227/10 |
| 4,920,898 | A | 5/1990 | Solbes et al. | 110/265 |
| 5,090,606 | A | 2/1992 | Torii et al. | 227/10 |
| 5,191,861 | A | 3/1993 | Kellerman et al. | 123/46 SC |
| 5,213,247 | A | 5/1993 | Gschwend et al. | 227/10 |
| 5,540,194 | A | 7/1996 | Adams | 123/46 R |
| 6,006,704 | A | 12/1999 | Phillips et al. | 123/46 SC |
| 6,016,945 | A | 1/2000 | Phillips et al. | 227/10 |
| 6,041,603 | A | 3/2000 | Phillips | 60/632 |
| 6,045,024 | A | 4/2000 | Phillips | 227/130 |
| 6,073,605 | A | 6/2000 | Matsuoka et al. | 123/292 |
| 6,206,660 | B1 | 3/2001 | Coney et al. | 417/438 |
| 6,491,002 | B1 | 12/2002 | Adams | 123/46 R |
| 2001/0006045 | A1 | 7/2001 | Thieleke et al. | 123/46 R |

*Primary Examiner*—Hoang Nguyen
(74) *Attorney, Agent, or Firm*—Thomas B. Ryan; Brian B. Shaw, Esq.; Harter, Secrest & Emery LLP

(57) ABSTRACT

A combustion chamber system of a spark-ignition linear engine includes a pre-combustion chamber and a main combustion chamber separated by a combustion control wall. The pre-combustion chamber has a length substantially greater than its width to support the propagation of more organized flame fronts that push unburned fuel and air into the main combustion chamber. The pre-combustion chamber can be arranged to define a multi-stage annular structure comprising a plurality of pre-combustion chamber sections fluidically connected together in an axially stacked array wherein the main combustion chamber can be co-axially housed or accommodated internally within the annular pre-combustion chamber structure.

83 Claims, 7 Drawing Sheets

FIG. 3B
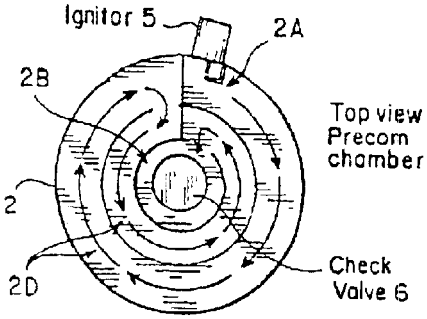
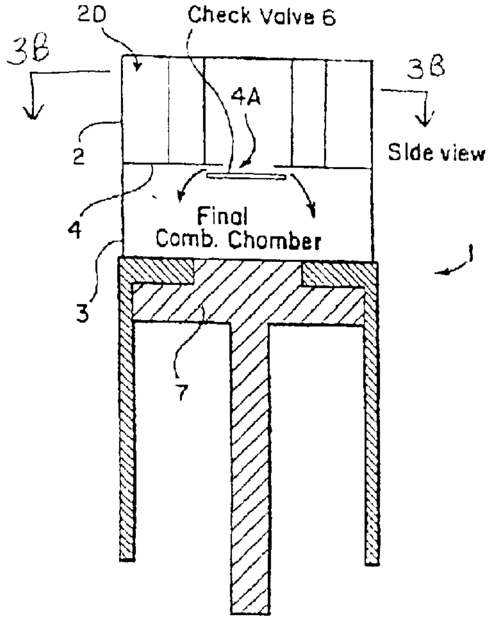
FIG. 3A
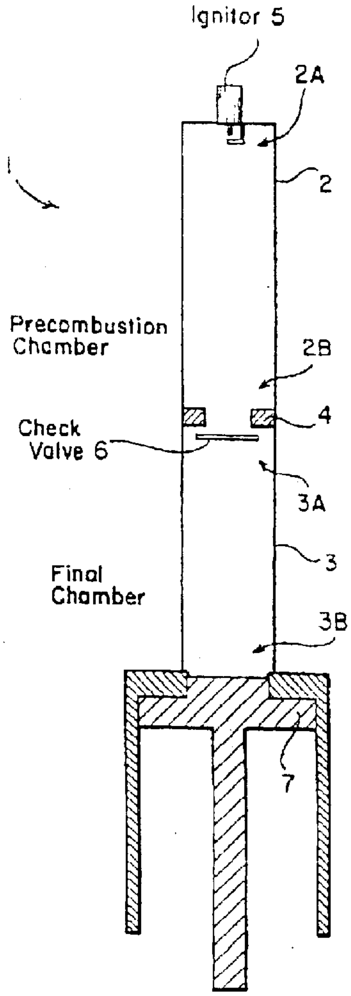
FIG. 4

COMBUSTION CHAMBER SYSTEM

CROSS REFERENCE TO RELATED PATENT APPLICATIONS

This patent application is a Continuation of U.S. patent application Ser. No. 10/050,836 filed on 16 Jan. 2002 now abandoned and entitled COMBUSTION CHAMBER SYSTEM WITH SPOOL-TYLE PRE-COMBUSTION CHAMBER, which is a Continuation-In-Part of U.S. patent application Ser. No. 09/813,058 filed on 20 Mar. 2001 now abandoned and entitled COMBUSTION CHAMBER SYSTEM, and is a Continuation-in-Part of U.S. patent application Ser. No. 10/050,416, filed on 16 Jan. 2002 now abandoned and entitled COMBUSTION CHAMBER SYSTEM, all in the name of Joseph S. Adams and all hereby incorporated by reference.

FIELD OF THE INVENTION

The present invention relates generally to improved combustion chamber systems of spark-ignition linear engines, and more particularly to like systems used for combustion-powered tools such as those used for driving fasteners into workpieces or substrates. The improvements are specifically directed to combustion chamber systems that include a pre-combustion chamber and a main combustion chamber in which ignition originating in the pre-combustion chamber forces unburned fuel and air into the main combustion chamber in advance of a flame jet.

BACKGROUND OF THE INVENTION

I have developed a number of combustion chamber systems for spark-ignition linear engines in which the combustion chamber comprises, or is effectively divided into, a pre-combustion chamber and a main combustion chamber. Examples of such dual combustion chamber systems are disclosed within U.S. Pat. No. 4,759,318 which issued to me on Jul. 26, 1988, U.S. Pat. No. 4,665,868 which issued to me on May 19, 1987, U.S. Pat. No. 4,510,748 which issued to me on Apr. 16, 1985, and U.S. Pat. No. 4,365,471 which issued to me on Dec. 28, 1982. Ignition preferably originates in the pre-combustion chambers of such systems. Some unburned fuel and air in the pre-combustion chamber is forced ahead of a flame jet into the main combustion chamber. Upon arrival, the flame jet triggers combustion of a compressed fuel and air mixture in the main combustion chamber.

When a combustion cycle is initiated, both the pre-combustion chamber and the main combustion chamber are charged with a mixture of fuel and air, and the pre-established mixture within the pre-combustion chamber is then ignited. Ideally, a generated flame front propagates through the pre-combustion chamber so as to push unburned fuel and air in front of it toward the main combustion chamber, thereby further mixing and compressing the fuel and air in the main combustion chamber. A check valve effectively separates the pre-combustion and main combustion chambers so as to permit the unburned fuel and air and the flame front to enter the main combustion chamber from the pre-combustion chamber but to limit any reverse flow of combustion products from the main combustion chamber back into the pre-combustion chamber. As the flame front enters the main combustion chamber, it ignites the compressed fuel and air mixture disposed within the main combustion chamber. This process elevates the combustion pressure within the main combustion chamber leading to a more efficient combustion within the main combustion chamber. Accordingly, such higher pressures can more effectively and powerfully perform useful work, such as driving of fasteners with combustion-powered fastener-driving tools.

It is also desirable or even necessary that, in connection with the use of certain combustion-powered fastener-driving tools, the tools be readily portable, relatively light in weight, and relatively small in size. Accordingly, it is desirable to achieve the aforenoted combustion process wherein the combustion pressure within the main combustion chamber is substantially elevated so as to lead to more efficient combustion within the main combustion chamber whereby such higher pressures can more effectively and more powerfully perform useful work, such as, for example, the driving of fasteners through and out from combustion-powered fastener-driving tools, and yet the tools must be readily portable, relatively light in weight, and relatively small in size.

A need therefore exists in the art for a new and improved combustion-powered tool which has incorporated therein suitable structure which is capable of readily attaining enhanced energy output levels such that the resulting energy derived from the combustion-powered tool enables the combustion-powered tool to be used in connection with the installation of fasteners into substrates or workpieces, and yet the internal structure incorporated within the tool for achieving the desired energy output levels is itself compact so as to in turn render the overall tool readily portable, relatively light in weight, and relatively small in size.

OBJECTS OF THE INVENTION

Accordingly, it is an object of the present invention to provide a new and improved combustion-powered tool.

Another object of the present invention is to provide a new and improved combustion-powered tool which effectively overcomes the various operational disadvantages and drawbacks characteristic of prior art combustion-powered tools.

An additional object of the present invention is to provide a new and improved combustion-powered tool wherein the resulting or derived energy levels, characteristic of the combustion process within the combustion-powered tool, is readily enhanced.

A further object of the present invention is to provide a new and improved combustion-powered tool wherein the resulting or derived energy levels, characteristic of the combustion process within the combustion-powered tool, is readily enhanced so as to enable the combustion-powered tool to generate elevated driving forces, acceleration, and velocity characteristics or parameters.

A further object of the present invention is to provide a new and improved combustion-powered tool wherein the resulting or derived energy levels, characteristic of the combustion process within the combustion-powered tool, are readily enhanced so as to enable the combustion-powered tool to generate elevated driving forces, acceleration, and velocity characteristics or parameters by means of compact structure so as to in turn render the overall tool readily portable, relatively light in weight, and relatively small in size.

SUMMARY OF THE INVENTION

Increasing a length-to-width aspect ratio of pre-combustion chambers of spark-ignition linear engines has been found to significantly improve the engine performance.

Relatively long and narrow pre-combustion chambers having an aspect ratio of 2:1 or more support the propagation of more organized flame fronts to push more unburned fuel and air ahead of the flame fronts into main combustion chambers. The elongated pre-combustion chambers can be straight, curved, or folded into non-linear paths. Several performance varying parameters can be manipulated to produce significantly more compression in a main combustion chamber and thereby dramatically increase power output. Although unburned fuel and air is preferably allowed to pass relatively unimpeded from the pre-combustion chamber into the main combustion chamber, a check valve preferably blocks any high pressure back flow from the combustion chamber back into the pre-combustion chamber.

The foregoing and other objects of the invention are achieved in accordance with the teachings and principles of the my invention through the provision of a new and improved combustion-powered tool including a combustion chamber system that is effectively divided into a pre-combustion chamber and a main combustion chamber. A combustion control wall separates the pre-combustion chamber from the main combustion chamber, and a check valve is operatively associated with the combustion control wall so as to effectively permit combustion products, the propagating combustion flame front, and unburned fuel and air to flow from the pre-combustion chamber into the main combustion chamber but to subsequently effectively prevent any combustion products, wave fronts, or unburned fuel and air to flow in a reverse direction from the main combustion chamber back into the pre-combustion chamber.

Increasing the aspect ratio, which is defined as the ratio of the length-to-width dimensions, of the pre-combustion chamber, can dramatically improve the performance of the combustion process. Constructing the pre-combustion chamber so as to be significantly longer than wider at aspect ratios of at least 2:1 enables flame fronts generated by ignition at a first end of the pre-combustion chamber to push more unburned fuel and air through a second end of the pre-combustion chamber into the main combustion chamber than was possible with a conventional, normally short and wide pre-combustion chamber. This process elevates the combustion pressure within the main combustion chamber leading to a more efficient combustion within the main combustion chamber. Such higher pressures can more effectively and more powerfully perform useful work, such as, for example, the driving of fasteners through and out from combustion-powered fastener-driving tools.

In order to render the combustion chamber system more compact, the pre-combustion chamber preferably has a spool-like structure wherein the pre-combustion chamber advantageously comprises either a two-stage or three-stage structure comprising a plurality of serially arranged, fluidically interconnected curved sections which define a flow path which extend from an igniter disposed within a first end of the pre-combustion chamber to a second end of the pre-combustion chamber which is fluidically connected to the main combustion chamber. The stages of the pre-combustion chamber are vertically stacked atop one another and the second end of the pre-combustion chamber can be fluidically connected to the main combustion chamber which axially extends beyond the pre-combustion chamber, or alternatively, in accordance with further compact arrangement techniques, the axial extent of the main combustion chamber can be coaxially housed or accommodated internally within the axial extent of the pre-combustion chamber.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 3A is a view similar to that of FIG. 1 showing, however, a third embodiment of a combustion chamber system constructed in accordance with the principles and teachings of the present invention wherein the pre-combustion chamber comprises a plurality of curved sections which are disposed in a nested arrangement;

FIG. 3B is a cross-sectional view of the combustion chamber system disclosed within FIG. 3A as taken along the lines 3B—3B of FIG. 3A;

FIG. 4 is a view similar to that of FIG. 1 showing, however a fourth embodiment of a combustion chamber system constructed in accordance with the principles and teachings of the present invention and showing the structure and relative disposition of the pre-combustion and main combustion chambers thereof wherein the pre-combustion and main combustion chambers are both linear and coaxially arranged with respect to each other, and wherein further, the axis of the fastener-driving piston is likewise coaxial with the common axis of the pre-combustion and main combustion chambers;

DETAILED DESCRIPTION OF THE PREFERRED EMBODIMENT

Figure 1:
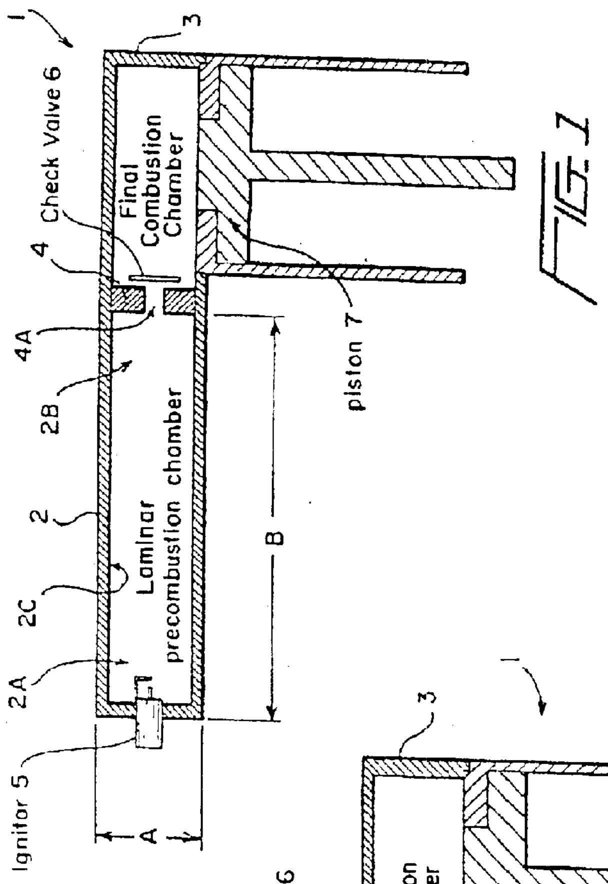
FIG. 1 is a schematic cross-sectional view of a first embodiment of a combustion chamber system constructed in accordance with the principles and teachings of the present invention and showing the structure and relative disposition of the pre-combustion and main combustion chambers thereof wherein the pre-combustion and main combustion chambers are both linear and coaxially arranged with respect to each other, however, the axis of the fastener-driving piston is substantially perpendicular to the common axis of the pre-combustion and main combustion chambers.

The interests of compact mechanical design have resulted in prior combustion systems for spark-ignition linear engines, including my own, having a relatively short length and diameters or widths that are generally much larger than their lengths. Experiments in lengthening pre-combustion chambers so that their length to width aspect ratios are greatly increased (i.e., 2:1 or more) has revealed that the higher aspect ratio pre-combustion chambers are much more effective at forcing unburned fuel and air ahead of an advancing flame front into a main combustion chamber. This improvement increases pressure in the main combustion chamber before ignition occurs there, and this greatly increases the power obtainable from combustion in the main combustion chamber.

The reasons why elongated pre-combustion chambers accomplish this result remains unclear However, experimental evidence verifies the fact that elongated pre-combustion chambers do succeed in forcing more unburned fuel and air into the main combustion chamber so as to achieve increased power output levels. It is reasonable to assume, for example, that the increased amount of fuel and air pumped into the main combustion chamber from an elongated pre-combustion chamber occurs in advance of a flame front proceeding from the ignition end of the pre-combustion chamber toward the discharge end of the pre-combustion chamber which communicates with the main combustion chamber. The improvement in power output from the main combustion chamber can be increased by as much as fifty percent (50%) simply by elongating the pre-combustion chamber wherein the same has an optimum aspect ratio.

More particularly, in accordance with the principles and teachings of the present invention, combustion chamber systems with elongated linear (i.e., straight) pre-combustion chambers having length to width ratios over a broad range have been tested, and it has been noted that some improvement in performance has been achieved when the aspect ratio is on the order of 2:1. Even better performance has been achieved when the aspect ratio is within the range of 4:1 to 16:1, and still further, peak performance has been attained when the aspect ratio is approximately 10:1. Overall, the results tend to show that the improvement in performance derived from an elongated linear pre-combustion chamber tends to simulate a bell-shaped curve which has its peak centered at an aspect ratio of approximately 10:1.

It has been additionally noted that discontinuities or irregularities present within or upon the internal surfaces of the linear pre-combustion chamber should be avoided in view of the fact that such structures tend to degrade power output. Still further, it has been noted that the pre-combustion chambers can comprise round, oval, rectangular, or other cross-sectional configurations whereby they will all function desirably well as long as the length of the pre-combustion chamber is substantially greater than the average width. Yet further, it has been noted that the elongated pre-combustion chambers readily enable the scavenging of exhaust gases.

In addition to the elongated pre-combustion chambers having the aforenoted linear configurations, the elongated pre-combustion chambers, which are capable of generating substantially increased piston power output can be curved, or folded, in effect, back onto themselves. Again, as long as the curved or folded pre-combustion chambers have relatively high aspect ratios, the aforenoted performance advantages will be able to be achieved. In fact, the flame front created or generated within such elongated and curved pre-combustion chambers propagates relatively faster. Curving an elongated pre-combustion chamber along its length seems to shift the aforenoted bell-shaped curve as well as decrease the overall combustion time within the pre-combustion chamber. It has therefore been found or determined that by curving or folding the elongated pre-combustion chamber, increased power and shorter combustion times can be achieved at significantly higher aspect ratio values, such as, for example, with the range of 15:1 to 30:1. More particularly, the pre-combustion chambers can be formed from or comprise curved sections that are joined in series, nested together, and/or combined with straight combustion chambers or combustion chamber sections so as to form compact assemblages that are capable of achieving the objective advantages of the present invention.

In addition, the output performance of the elongated pre-combustion chambers can be influenced by means of the aspect ratios concerning the width and thickness dimensions of the pre-combustion chambers. For example, an elongated pre-combustion chamber having a rectangular cross-section and which would therefore be expected to exhibit enhanced output performance characteristics will fail to perform well if the aspect ratio of the width to thickness dimensions is relatively high. In other words, as the structure, shape, or configuration of an elongated pre-combustion chamber approaches that of a thin ribbon, the pre-combustion chamber can become too constricted so as not to be capable of successfully pumping unburned fuel and air into the main combustion chamber. Experiments have indicated that an optimal or desirable width to thickness aspect ratio for elongated pre-combustion chambers is 4:1 or less.

Referring to the drawings, and more particularly to FIG. 1 thereof, the combustion chamber system is generally indicated by the reference character 1 and is seen to comprise a pre-combustion chamber or plenum 2 and a main combustion chamber or plenum 3 wherein the pre-combustion and main combustion chambers or plenums 2 and 3 are separated from each other by means of a combustion control wall 4. An igniter 5 is disposed within a first end portion 2A of the pre-combustion chamber 2, and it is seen that the main combustion chamber 3 is disposed adjacent to the second opposite end 2B of the pre-combustion chamber 2. An aperture 4A is defined within the combustion control wall 4 so as to permit the flame front generated within the pre-combustion chamber 2 by means of the igniter 5 to pass through the combustion control wall 4 and into the main combustion chamber 3. Ignition of the fuel and air mixture within the main combustion chamber 3 then serves to drive a working piston 7.

In accordance with the principles and teachings of the present invention, and unlike prior art combustion chamber systems, it is seen that pre-combustion chamber 2 has a predetermined length dimension B and a predetermined width dimension A, wherein the length B is substantially greater than the width A. More particularly, the ratio of the length B to the width A, known as the aspect ratio of the pre-combustion chamber 2, is at least 2:1. A check valve 6 is operatively disposed within the main combustion chamber 3 and is disposed adjacent to the aperture 4A defined within the combustion control wall 4 so as to minimally impede, and therefore to effectively allow, the free flow of a fuel and air mixture from the pre-combustion chamber 2 into the main combustion chamber 3. Subsequently, when combustion is initiated within the main combustion chamber 3, the pressure present therein rapidly increases and consequently, the check valve 6 is closed so as to limit and effectively prevent any back flow from occurring from main combustion chamber 3 into pre-combustion chamber 2. The interior peripheral surface 2C of the pre-combustion chamber 2 is substantially smooth and free of protrusions or irregularities, and the average distance defined between diametrically opposite side wall surfaces of the interior peripheral wall surface 2C of pre-combustion chamber 2 constitutes the width A.

Figure 2:
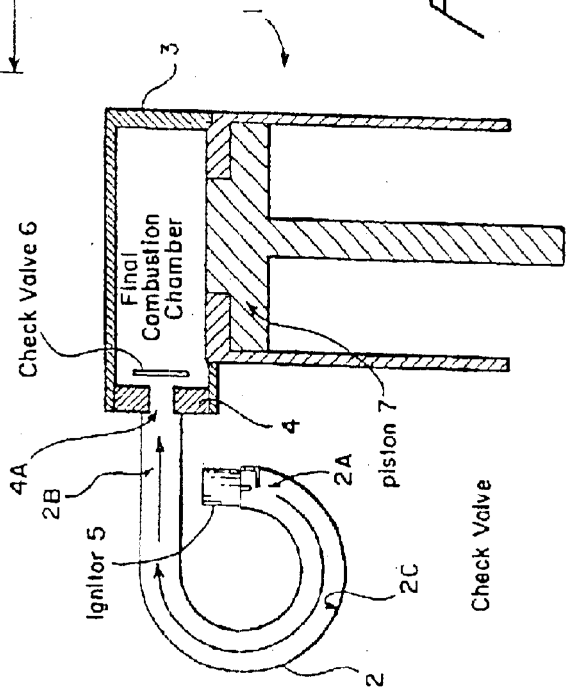
FIG. 2 is a view similar to that of FIG. 1 showing, however, a second embodiment of a combustion chamber system constructed in accordance with the principles and teachings of the present invention wherein the pre-combustion chamber is curved.

With reference now being made to FIG. 2, it is seen that the structure of the main combustion chamber 3, as well as its dispositional relationship with respect to the working piston 7, is substantially the same as that of main combustion chamber 3 as in the first embodiment of FIG. 1. However, in accordance with the second embodiment of the present invention as disclosed in FIG. 2, it is also seen that the pre-combustion chamber 2 comprises a curved section integrally connected to a linear section so as to render the entire pre-combustion chamber 2 more spatially compact. More particularly, a pre-combustion chamber 2 such as that illustrated in FIG. 2 permits pre-combustion chambers characterized by higher aspect ratios to achieve results which are similar to results attained using elongated linear pre-combustion chambers having similar aspect ratios but requiring substantially more linear space. The length of the pre-combustion chamber 2 is measured from the igniter end 2A of the pre-combustion chamber 2 to the combustion control wall end 2B of the pre-combustion chamber 2 along a line which is substantially equidistant between the oppositely disposed side wall surface portions of the interior peripheral wall surface 2C of the pre-combustion chamber 2. The curved section of the pre-combustion chamber 2 is also seen to have an angular extent of approximately 270°.

With reference now being made to FIGS. 3A and 3B, and in accordance with further spatial conservation techniques developed in accordance with the principles and teachings of the present invention, it is seen that the pre-combustion chamber 2 comprises a plurality of curved sections 2D which are fluidically arranged in series and are nested together so as to be disposed within a substantially common plane and thereby effectively form a three-stage pre-combustion chamber 2. Alternatively, the overall pre-combustion chamber 2 could have a substantially S-shaped configuration, a spiral configuration, or some other configuration comprising a combination of straight and curved sections. Curved pre-combustion chamber 2 such as that illustrated within FIGS. 3A and 3B is formed by means of integrally connecting together different cylinders, having different diametrical extents, in the noted coaxial array. It is therefore to be appreciated, in conjunction with the operation of the pre-combustion chamber 2 as disclosed within FIGS. 3A and 3B, that a flame front initiated by ignition of the igniter 5 within the region 2A of the first outermost pre-combustion chamber portion 2D first travels around the outermost periphery of the pre-combustion chamber 2, and subsequently enters a second intermediate peripheral portion 2D of the pre-combustion chamber 2 through means of a first radially oriented port fluidically connecting the outermost and intermediate peripheral flow paths of the pre-combustion chamber 2.

The flame front then continues to travel around the intermediate peripheral portion 2D of the pre-combustion chamber 2 and subsequently enters a third innermost pre-combustion chamber portion 2D of the pre-combustion chamber 2 through means of a second radially oriented port fluidically connecting the intermediate and innermost peripheral flow paths of the pre-combustion chamber 2. Ultimately, the flame front then passes by or through a centrally located check valve 6 so as to enter the main combustion chamber 3.

Alternatively, ignition could be initiated within a central chamber whereby the flame front would be fluidically conducted and propagated in effect radially outwardly from an inner peripheral pre-combustion chamber portion 2D of the pre-combustion chamber 2 to an outer peripheral pre-combustion chamber portion 2D of the pre-combustion chamber 2, and ultimately into the main combustion chamber 3. Either way, the movement of the flame front within the curved and substantially folded pre-combustion chamber portions 2D forces unburned fuel and air through the check valve 6 and into the main combustion chamber 3 so as to increase the pressure of the unburned fuel and air with main combustion chamber 3. Such an increase in the operative pressure significantly increases the combustion power output of main combustion chamber 3 as operatively applied to driving the working piston 7. It is to be noted that the improvement afforded by increasing the aspect ratio of the combustion chamber 1 an be as much as a fifty percent (50%) increase in the power output exhibited by piston 7.

With reference now being made to FIG. 4, a variation of the first embodiment of FIG. 1 is disclosed within FIG. 4, wherein the pre-combustion chamber 2, the main combustion chamber 3, and the drive chamber within which the piston 7 is operatively disposed are all coaxially arranged with respect to each other. The volumes of the pre-combustion chamber 2 and the main combustion chamber 3 of this fourth embodiment are substantially equal whereby satisfactory increases in power output are achieved in accordance with the objectives of the present invention, and it is noted further that the length to width aspect ratio of the pre-combustion chamber 2 of the fourth embodiment of FIG. 4 is approximately 4:1.

Figure 5B:
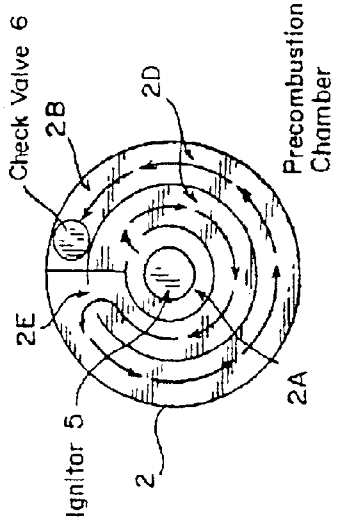
FIG. 5B is a cross-sectional view of the combustion chamber system disclosed within FIG. 5A as taken along the lines 5B—5B of FIG. 5A.
Figure 5C:
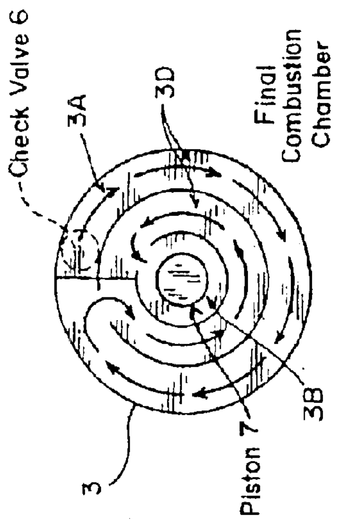
FIG. 5C is a cross-sectional view of the combustion chamber system disclosed within FIG. 5A as taken along the lines 5C—5C of FIG. 5A.
Figure 5A:
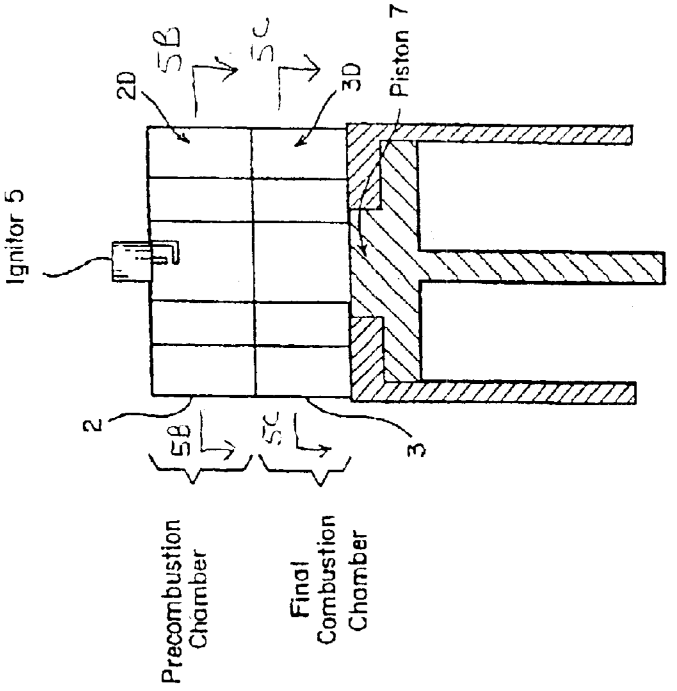
FIG. 5A is a view similar to that of FIG. 3A showing, however, a fifth embodiment of a combustion chamber system constructed in accordance with the principles and teachings of the present invention wherein each one of the pre-combustion and main combustion chambers comprises a plurality of curved sections which are disposed in a nested arrangement.

Continuing still further, and with reference now being made to FIGS. 5A–5C, a fifth embodiment of a combustion chamber system is constructed similar to the third embodiment shown in FIGS. 3A and 3B in that the pre-combustion chamber 2 comprises a three-stage pre-combustion chamber structure. However, in addition, the main combustion chamber 3 likewise comprises a three-stage combustion chamber structure. Still further, it is appreciated that the pre-combustion chamber 2 of this fifth embodiment differs from the pre-combustion chamber 2 of the third embodiment as disclosed within FIGS. 3A and 3B in that the igniter 5 is disclosed at a central or axial position with respect to the pre-combustion chamber 2 and therefore the flame front effectively propagates from a radially inner portion of the pre-combustion chamber 2 through radially oriented ports 2E to a radially outer portion of the pre-combustion chamber 2. Concomitantly therewith, the flame front will be introduced into the main combustion chamber 3, through means of check valve 6, at a radially outer portion of the combustion chamber system 1 and be conducted toward a radially inner or axial position of the combustion chamber system at which the working piston 7 is located.

Figure 6B:
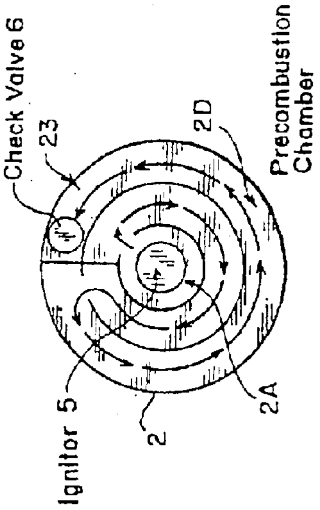
FIG. 6B is a cross-sectional view of the combustion chamber system disclosed within FIG. 6A as taken along the lines 6B—6B of FIG. 6A.
Figure 6C:
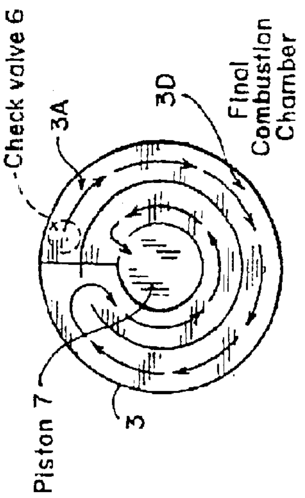
FIG. 6C is a cross-sectional view of the combustion chamber system disclosed within FIG. 6A as taken along the lines 6C—6C of FIG. 6A.
Figure 6A:
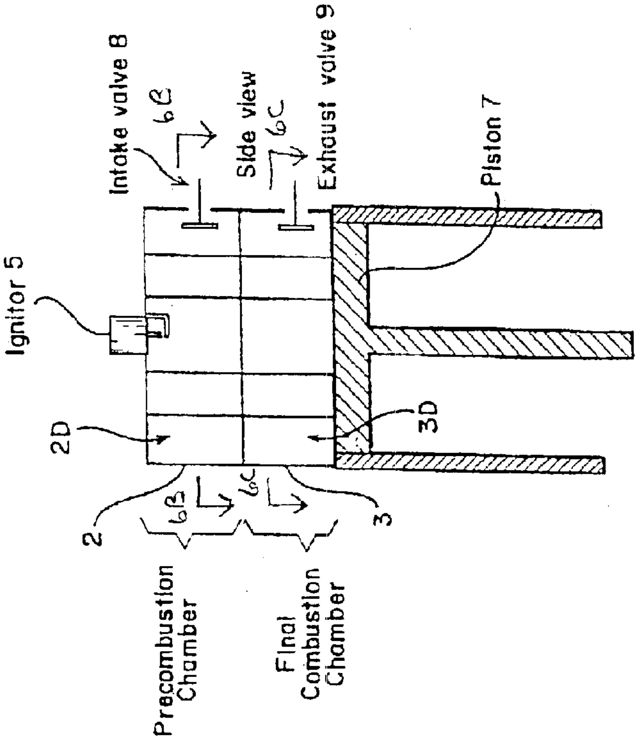
FIG. 6A is a view similar to that of FIG. 3A showing, however, a sixth embodiment of a combustion chamber system constructed in accordance with the principles and teachings of the present invention wherein each one of the pre-combustion and main combustion chambers comprises a plurality of curved sections which are disposed in a nested arrangement.

A sixth embodiment of the present invention as disclosed within FIGS. 6A–6C is substantially the same as that of the fifth embodiment of FIGS. 5A–5C with the additional disclosure of an intake valve 8 being disposed within an outer peripheral wall portion of the pre-combustion chamber 2D while an exhaust valve 9 is similarly disposed within an outer peripheral wall portion of the main combustion chamber 3. This arrangement serves to compactly accommodate the purging requirements of exhaust gases from the main combustion chamber 3, as well as fuel and air intake requirements into the pre-combustion chamber 2.

Figure 7B:
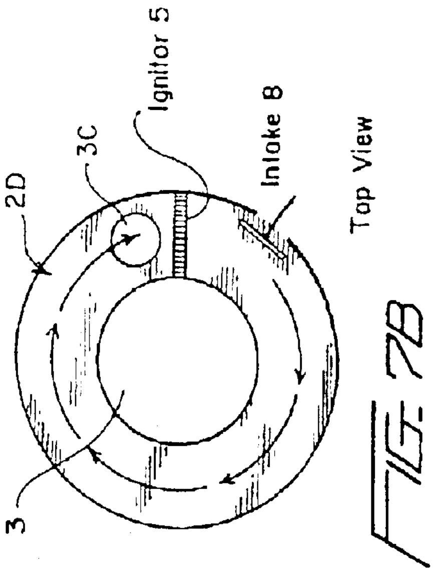
FIG. 7B is a cross-sectional view of the combustion chamber system disclosed within FIG. 7A as taken along the lines 7B—7B of FIG. 7A.
Figure 7C:
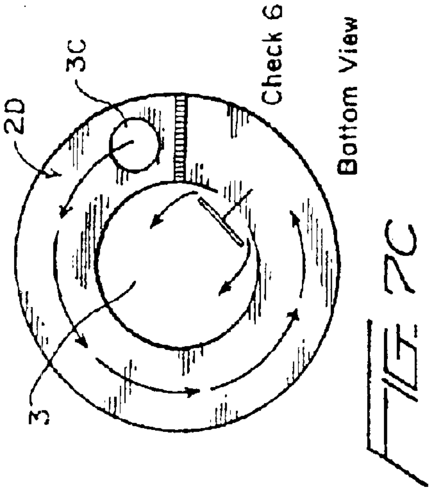
FIG. 7C is a cross-sectional view of the combustion chamber system disclosed with FIG. 7A as taken along the lines 7C—7C of FIG. 7A.
Figure 7A:
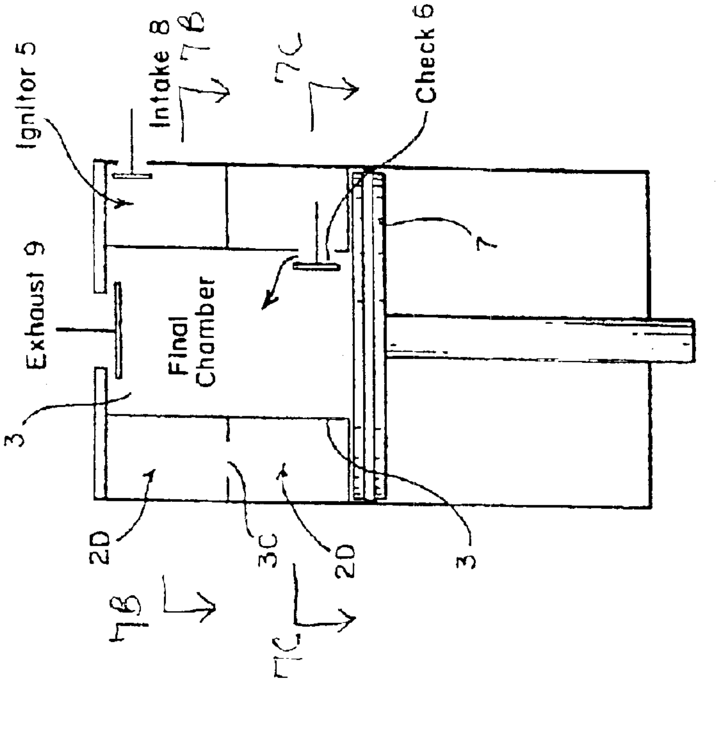
FIG. 7A is a view similar to that of FIG. 3A showing, however, a seventh embodiment of a combustion chamber system constructed in accordance with the principles and teachings of the present invention wherein the pre-combustion chamber comprises a plurality of curved sections which are disposed in a vertically stacked spool arrangement.

With reference now being made to FIGS. 7A–7C, a seventh embodiment of the present invention is seen to be disclosed; and in accordance with this embodiment, the pre-combustion chamber 2 has been divided into two coaxially arranged sections 2D wherein the sections 2D are also axially separated from each other so as to be disposed, for example, within a two-stage, vertically stacked spool-type array. The igniter 5 is located at a predetermined circumferential position within the vertically upper one of the pre-combustion chamber sections 2D and accordingly initiates combustion that proceeds around the upper one of the pre-combustion chamber sections 2D such that the flame front then propagates through an aperture or opening 3C, which fluidically connects the upper one of the pre-combustion chamber sections 2D to the lower one of the pre-combustion chamber sections 2D.

After traversing the lower one of the pre-combustion chamber sections 2D, the flame front propagates toward the check valve 6 whereupon passing through check valve 6, the flame front enters the cylindrical main combustion chamber 3 disposed radially inwardly of the annularly surrounding pre-combustion chamber sections 2D. The flame front enters the main combustion chamber 3 at a position adjacent to the working piston 7 after the main combustion chamber 3 receives unburned fuel and air from the pre-combustion chamber 2 as effectively forced into main combustion chamber 3 from pre-combustion chamber 2 by means of the propagating flame front. Exhaust from the main combustion chamber 3 is permitted to occur through an exhaust valve 9 which is located within an end wall of the main combustion chamber 3, which is disposed opposite the working piston 7, while fuel and air intake into the upper pre-combustion chamber section 2D occurs through means of intake valve 8 preferably disposed adjacent to igniter 5.

As has been noted heretofore, check valve 6 should be as free-flowing as possible. However, it has been determined that the check valve 6 can be either a normally open or a normally closed type of check valve. In either case, the check valve 6 will be disposed in an open state so as to allow a relatively free flow of gases from the pre-combustion chamber 2 into the main combustion chamber 3 and will subsequently be disposed in its closed state when the fuel and air mixture within the main combustion chamber is ignited. It may also be desirable in connection with some applications, in order to properly scavenge exhaust gases or to distribute unburned fuel and air through the system, to make the check valve 6 free-flowing in both directions at low pressure levels. The increased pressure level that promptly follows ignition within the main combustion chamber 3 will then quickly close the check valve 6 so as to limit or effectively prevent back-flow from the main combustion chamber 3 back into the pre-combustion chamber 2. Check valve 6 may also be arranged so as to quench a pre-combustion flame front after admitting unburned fuel and air into the main combustion chamber 3. An igniter within the main combustion chamber 3 can then initiate combustion within the main combustion chamber 3.

Figure 8:
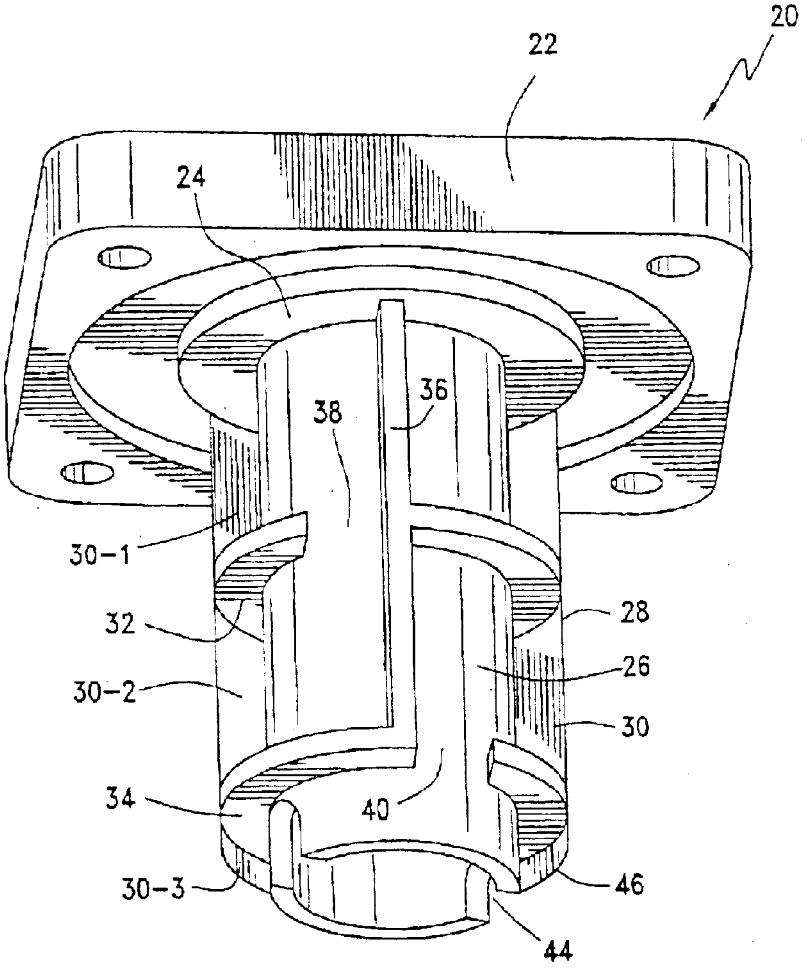
FIG. 8 is a perspective view partially similar to that of FIG. 7A showing, however, an eighth embodiment of the present invention wherein a three-stage spool-type pre-combustion chamber is disclosed.

With reference now being made to FIG. 8, an eighth embodiment of a pre-combustion chamber assembly constructed in accordance with the principles and teachings of the present invention is disclosed and is generally indicated by the reference character 20. The structure of this pre-combustion chamber assembly 20 is seen to be similar to that of the pre-combustion chamber 2 as disclosed within FIG. 7A except that in lieu of the two-stage, vertically stacked spool-type array of FIG. 7A, the pre-combustion chamber assembly 20 is seen to comprise a three-stage, vertically stacked spool-type array. More particularly, the pre-combustion chamber assembly 20 is seen to comprise a support base 22, which forms a first upper end wall 24 of the pre-combustion chamber assembly 20, and a pair of radially inner and radially outer cylindrical walls 26, 28, which together form an annular pre-combustion chamber 30 therebetween.

A pair of axially spaced, radially oriented annular partition walls 32, 34 are integrally connected to and are interposed between the radially inner and radially outer cylindrical walls 26, 28, and accordingly, the partition walls 32, 34 effectively divide the pre-combustion chamber 30 into three vertically or axially separated pre-combustion chambers 30-1, 30-2, 30-3. An axially oriented partition wall 36 also structurally cooperates with upper end wall 24 and the pair of annular partition walls 32, 34 in defining the three pre-combustion chambers 30-1, 30-2, 30-3. In addition, each one of the annular partition walls 32, 34 is only partially complete in its circumferential extent and thereby effectively forms a pair of axially oriented ports 38, 40 which, as will be described shortly hereinafter, serve to respectively fluidically interconnect pre-combustion chambers 30-1 and 30-2, and 30-2 and 30-3, to each other.

An igniter, not shown, can be located at a predetermined position within the vertically or axially uppermost one of the pre-combustion chambers 30-1, and upon the right side of the vertically or axially oriented partition wall 36, so as to initiate combustion that proceeds circumferentially around the upper one of the pre-combustion chambers 30-1 such that the flame front then propagates through the first axially oriented port 38 so as to enter the next or axially central one of the pre-combustion chambers 30-2. In a manner similar to the propagation of the flame front within the uppermost one of the pre-combustion chambers 30-1, that is, after circumferentially traversing the axially central one of the pre-combustion chambers 30-2, the flame front propagates through the second axially oriented port 40 so as to enter the lowermost one of the pre-combustion chambers 30-3. The lower end portion of the pre-combustion chamber assembly 20, and in particular, the lower end portion of the radially inner cylindrical wall portion 26 is further provided with a pair of diametrically opposite radially oriented ports 42, 44 through which the flame front and unburned fuel and air from the pre-combustion chamber 30-3 can enter the lower end of an axially disposed main combustion chamber, not shown. An end wall 46 terminates the lower end of pre-combustion chamber 30-3.

As was the case with the previously disclosed embodiments, a check valve, also not shown, is preferably disposed within such lower end of the main combustion chamber, not shown, and may in fact be operatively associated with each one of the ports 42, 44 in a manner similar to that of the seventh embodiment of FIG. 7A, so as to freely control the admission of the flame front and the unburned fuel and air into the main combustion chamber from the pre-combustion chamber assembly 20 and to effectively limit any back flow of combustion and combustion products from the main combustion chamber into the pre-combustion chamber assembly 20. The main combustion chamber will of course also have a working piston, not shown, operatively associated therewith. After the main combustion chamber has received the unburned fuel and air from the pre-combustion chamber 30-3, as effectively forced into the main combustion chamber from pre-combustion chamber 30-3 by means of the propagating flame front, combustion occurs within the main combustion chamber, whereby the working piston will be driven downwardly so as to, for example, drive a fastener into a particular substrate.

Figure 9:
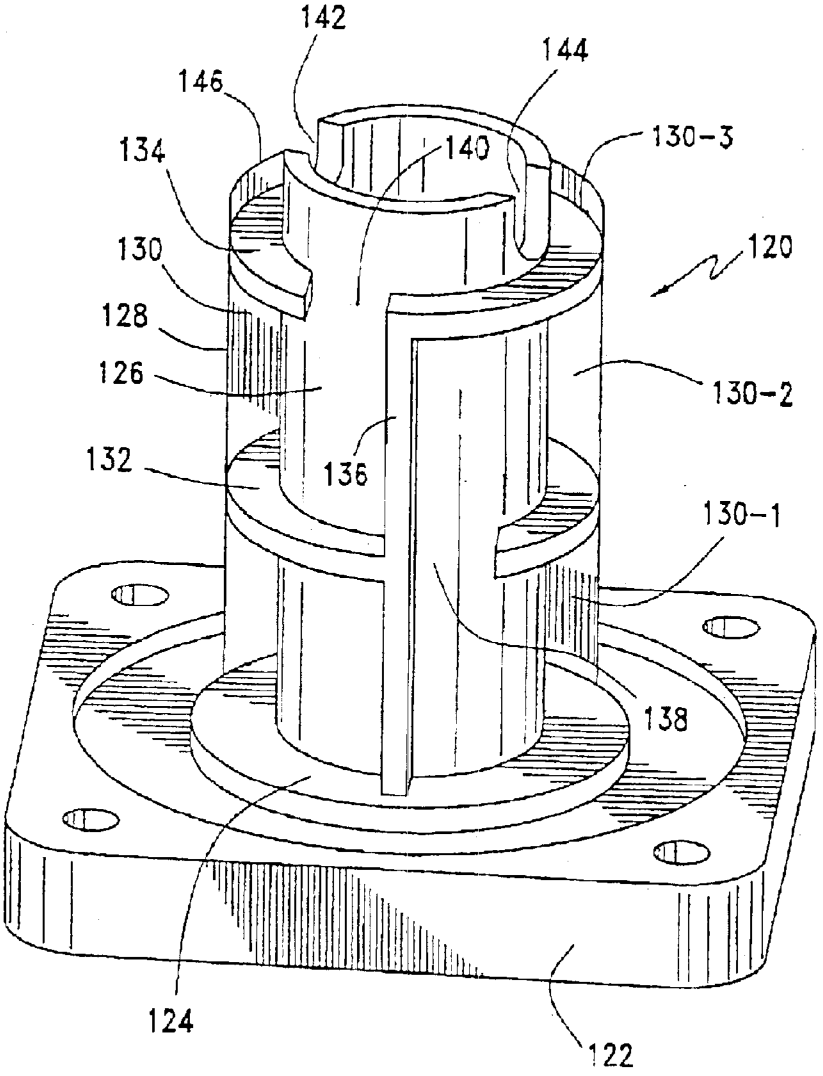
FIG. 9 is a view similar to that of FIG. 8 showing, however, a ninth embodiment of the present invention wherein an alternatively arranged or oriented three-stage spool-type pre-combustion chamber is disclosed.

With reference lastly being made to FIG. 9, a ninth embodiment of a pre-combustion chamber assembly constructed in accordance with the principles and teachings of the present invention is disclosed and is generally indicated by the reference character 120. The structure of this pre-combustion chamber assembly 120 is seen to be substantially the same as that of the pre-combustion chamber assembly 20 as disclosed within FIG. 8 except that the pre-combustion chamber assembly 120 has, in effect, been vertically upended with respect to the pre-combustion chamber assembly 20 of FIG. 8, the significance of which will become apparent shortly hereinafter. It is therefore to be noted further that in connection with the description of the structure comprising pre-combustion chamber assembly 120 as compared to that comprising pre-combustion chamber assembly 20, the component parts of the pre-combustion chamber assembly 120, which correspond to the component parts of the pre-combustion chamber assembly 20, are noted by similar reference characters except that the reference characters for the pre-combustion chamber assembly 120 will be within the 100 series.

More particularly, the pre-combustion chamber assembly 120 is seen to comprise a support base 122 which forms a first lower end wall 124 of the pre-combustion chamber assembly 120, and a pair of radially inner and radially outer cylindrical walls 126, 128 which together form an annular pre-combustion chamber 130 therebetween. A pair of axially spaced, radially oriented annular partition walls 132, 134 are integrally connected to and are interposed between the radially inner and radially outer cylindrical walls 126, 128, and accordingly, the partition walls 132, 134 effectively divide the pre-combustion chamber 130 into three vertically or axially separated pre-combustion chambers 130-1, 130-2, 130-3. An axially oriented partition wall 136 also structurally cooperates with lower end wall 124 and the pair of annular partition walls 132, 134 in defining the three pre-combustion chambers 130-1, 130-2, 130-3. Each one of the annular partition walls 132, 134 is only partially complete in its circumferential extent and thereby effectively forms a pair of axially oriented ports 138, 140 which, as will be described shortly hereinafter, serve to respectively fluidically interconnect pre-combustion chambers 130-1 and 130-2, and 130-2 and 130-3, to each other. It can therefore be appreciated that, as was the case with the pre-combustion chamber assembly 20, an igniter, not shown, can be located at a predetermined position within the vertically or axially lowermost one of the pre-combustion chambers 130-1, and upon the left side of the vertically or axially oriented partition wall 136, so as to accordingly initiate combustion that proceeds circumferentially around the lowermost one of the pre-combustion chambers 130-1 such that the flame front then propagates through the first axially oriented port 138 so as to enter the next or axially central one of the pre-combustion chambers 130-2. In a manner similar to the propagation of the flame front within the lowermost one of the pre-combustion chambers 130-1, that is, after circumferentially traversing the axially central one of the pre-combustion chambers 130-2, the flame front propagates through the second axially oriented port 140 so as to enter the uppermost one of the pre-combustion chambers 130-3. The upper end portion of the pre-combustion chamber assembly 120, and in particular, the upper end portion of the radially inner cylindrical wall portion 126 is further provided with a pair of diametrically opposite radially oriented ports 142, 144 through which the flame front and unburned fuel and air from the pre-combustion chamber 130-3 can enter the upper end of an axially disposed main combustion chamber, not shown. An end wall 146 terminates the lower end of pre-combustion chamber 130-3.

In accordance with the unique arrangement of the pre-combustion chamber assembly 120, particularly in connection with the main combustion chamber, not shown, and in a manner similar to the embodiments disclosed within FIGS. 7A and 8, the main combustion chamber is adapted to be effectively housed or accommodated within the inner cylindrical wall 126 whereby combustion within the main combustion chamber will propagate vertically or axially downwardly as viewed in FIG. 9. Accordingly, as was the case with the previously disclosed embodiments, a check valve, also not shown, is adapted to be disposed within such upper end of the main combustion chamber and may in fact be operatively associated with each one of the ports 142, 144 in a manner similar to that of the seventh embodiment of FIG. 7A, so as to freely control the admission of the flame front and the unburned fuel and air into the main combustion chamber from the pre-combustion chamber assembly 120 and to effectively limit any back flow of combustion and combustion products from the main combustion chamber into the pre-combustion chamber assembly 120. The main combustion chamber will of course also have a working piston, not shown, operatively associated therewith whereby, after the main combustion chamber has received the unburned fuel and air from the pre-combustion chamber 130-3 as effectively forced into the main combustion chamber from pre-combustion chamber 130-3 by means of the propagating flame front, combustion occurs within the main combustion chamber whereby, for example, the working piston will be driven downwardly so as to in turn drive a fastener into a particular substrate.

Thus, it may be seen that in accordance with the principles and teachings of the present invention, there has been disclosed a combustion chamber system comprising an elongated pre-combustion chamber used in combination with a main combustion chamber, and in conjunction with such pre-combustion chambers, there has been provided unique structural arrangements including pre-combustion chambers that have been rendered spatially compact and efficient. For instance, the pre-combustion chambers can be effectively divided into a plurality of axially separated but stacked pre-combustion chambers or sections that effectively form two and three-stage pre-combustion chamber structures or assemblies. Still further, in order to additionally render the pre-combustion chamber and main combustion assembly still more compact, the main combustion chamber has effectively been axially housed or accommodated internally within the pre-combustion assembly.

Obviously, many variations and modifications of the present invention are possible in light of the above teachings. More particularly, it is to be noted, as has been reflected by means of the various different embodiments already disclosed, that a variety of configurations, geometries, and proportions can implement or embody an elongated pre-combustion chamber so as to effectively increase the power output levels which are obtainable from the main combustion chamber. It is therefore to be understood that within the scope of the appended claims, the present invention may be practiced otherwise than as specifically described herein.

I claim:

1. A combustion chamber system, comprising:

a pre-combustion chamber comprising a first end wall, a second end wall disposed opposite said first end wall such that the distance defined between said first and second end walls defines the length of said pre-combustion chamber, a first side wall, and a second side wall disposed opposite said first side wall such that the distance defined between said first and second side walls defines the width of said pre-combustion chamber, wherein said length of said pre-combustion chamber is substantially greater than said width of said pre-combustion chamber;

a main combustion chamber fluidically connected to said pre-combustion chamber;

an ignition device operatively associated with said pre-combustion chamber so as to initiate combustion of a combustible mixture within said pre-combustion chamber;

said pre-combustion chamber comprising a plurality of pre-combustion chamber sections fluidically connected together and arranged within a multi-stage axially stacked annular array around an axis and having a predetermined axial extent; and wherein said main combustion chamber, having a predetermined axial extent is accommodated internally within said multi-stage axially stacked annular array of said pre-combustion chamber sections.

2. The combustion chamber system as set forth in claim 1, wherein the aspect ratio of said pre-combustion chamber, defined as the ratio of said length of said pre-combustion chamber to said length of said pre-combustion chamber, is at least 2:1.

3. The combustion chamber system as set forth in claim 2, wherein the aspect ratio of said pre-combustion chamber is within the range of 2:1 to 16:1.

4. The combustion chamber system as set forth in claim 1, wherein interior surface portions of said pre-combustion chamber are substantially smooth.

5. The combustion chamber system as set forth in claim 1, wherein said axial extent of said pre-combustion chamber and said axial extent of said main combustion chamber are substantially equal.

6. The combustion chamber system as set forth in claim 1, wherein said pre-combustion chamber and said main combustion chambers are coaxially disposed with respect to each other.

7. The combustion chamber system as set forth in claim 1, wherein an end wall of said main combustion chamber is provided with an exhaust port for exhausting combustion products toward a member upon which work is to be performed.

8. The combustion chamber system as set forth in claim 1, wherein a combustion control wall, having an aperture defined therein, is interposed between and separates said pre-combustion chamber and said main combustion chamber.

9. The combustion chamber system as set forth in claim 1, wherein said pre-combustion chamber comprising a plurality of pre-combustion chamber sections fluidically connected to each other comprises a first radically inner cylindrical member, a second radially outer cylindrical member, an axially oriented partition wall for separating opposite ends of said pre-combustion chamber sections, and at least one radially oriented partition wall for dividing said pre-combustion chamber into said plurality of pre-combustion sections.

10. The combustion chamber system as set forth in claim 9, wherein said pre-combustion chamber comprising said plurality of pre-combustion chamber sections fluidically connected together comprises a two-stage axially stacked annular array.

11. The combustion chamber system as set forth in claim 10, wherein said two-stage axially stacked annular array pre-combustion chamber comprises:

a first annular pre-combustion chamber section defined between said radially inner and radially outer cylindrical members and having a first end portion disposed at a predetermined circumferential location with respect to said axis, an igniter disposed within said first end portion of said first annular pre-combustion chamber section, and an annular flow path which extends circumferentially from said first end portion to a second end portion which is disposed at a predetermined circumferential location which is disposed adjacent to said first predetermined circumferential location at which said first end portion is located;

a second annular pre-combustion chamber section defined between said radially inner and radially outer cylindrical members and having a first end portion disposed at a predetermined circumferential location with respect to said axis which is substantially axially aligned with said second end portion of said first annular pre-combustion chamber section, and an annular flow path which extends circumferentially from said first end portion of said second annular pre-combustion chamber section to a second end portion which is disposed at a predetermined circumferential location which is disposed adjacent to said first end portion of said second annular pre-combustion chamber section is located, and which is fluidically connected to said main combustion chamber; and an axially oriented port fluidically interconnecting said second end portion of said first annular pre-combustion chamber section with said first end portion of said second annular pre-combustion chamber section such that said first and second annular pre-combustion chamber sections are fluidically connected together.

12. The combustion chamber system as set forth in claim 9, wherein said pre-combustion chamber comprising said plurality of pre-combustion chamber section fluidically connected together comprises a three-stage axially stacked annular array.

13. The combustion chamber system as set forth in claim 12, wherein said three-stage axially stacked annular array pre-combustion chamber comprises:

a first annular pre-combustion chamber section defined between said radially inner and radially outer cylindrical members and having a first end portion disposed at a predetermined circumferential location with respect to said axis, an igniter disposed within said first end portion of said first annular pre-combustion chamber section, and an annular flow path which extends circumferentially from said first end portion to a second end portion which is disposed at a predetermine circumferential location which is disposed adjacent to said first predetermined circumferential location at which said first end portion is located;

a second annular pre-combustion chamber section defined between said radially inner and radially outer cylindrical members and having a first end portion disposed at a predetermined circumferential location with respect to said axis which is substantially axially aligned with said second end portion of said first annular pre-combustion chamber section, and an annular flow path which extends circumferentially from said first end portion of said second annular pre-combustion chamber section to a second end portion which is disposed at predetermined circumferential location which is disposed adjacent to said first predetermined circumferential location at which said first end portion of said second annular pre-combustion chamber section is located;

a first axially oriented port fluidically interconnecting said second end portion of said first annular pre-combustion chamber section with said first end portion of said second annular pre-combustion chamber section such that said first and second annular pre-combustion chamber sections are fluidically connected together;

a third annular pre-combustion chamber section defined between said radially inner and radially outer cylindrical members and fluidically connected to said main combustion chamber; and a second axially oriented port fluidically interconnecting said second end portion of said second annular pre-combustion chamber section with said third annular pre-combustion chamber section such that said second and third annular pre-combustion chamber sections are fluidically connected together.

14. The combustion chamber system as set forth in claim 13, wherein said first annular pre-combustion chamber section comprises an uppermost one of said plurality of pre-combustion chamber sections such that the combustion process within said plurality of pre-combustion chamber sections proceeds axially downwardly.

15. The combustion chamber system as set forth in claim 13, wherein said first annular pre-combustion chamber section comprises a lowermost one of said plurality of pre-combustion chamber sections such that the combustion process within said plurality of pre-combustion chamber sections proceeds axially upwardly.

16. A combustion chamber system for use in connection with the driving of a working piston, comprising:

a pre-combustion chamber comprising a first end wall, a second end wall disposed opposite said first end wall such that the distance defined between said first and second end walls defines the length of said pre-combustion chamber, a first side wall, and a second side wall disposed opposite said first side wall such that the distance defined between said first and second side walls defines the width of said pre-combustion chamber, wherein said length of said pre-combustion chamber is substantially greater than said width of said pre-combustion chamber;

a main combustion chamber fluidically connected to said pre-combustion chamber;

an ignition device operatively associated with said pre-combustion chamber so as to initiate combustion of a combustion mixture within said pre-combustion chamber;

said pre-combustion chamber comprising a plurality of pre-combustion chamber sections fluidically connected together and arranged within a multi-stage axially stacked annular array around an axis and having a predetermined axial extent; and wherein said main combustion chamber, having a predetermined axial extent is accommodated internally within said multistage axially stacked annular array of said pre-combustion chamber sections.

17. The combustion chamber system as set forth in claim 16, wherein the aspect ratio of said pre-combustion chamber, defined as the ratio of said length of said pre-combustion chamber to said width of said pre-combustion chamber, is within the range of 2:1 to 16:1.

18. The combustion chamber system as set forth in claim 16, wherein interior surface portions of said pre-combustion chamber are substantially smooth.

19. The combustion chamber system as set forth in claim 16, wherein said axial extent of said pre-combustion chamber and said axial extent of said main combustion chamber are substantially equal.

20. The combustion chamber system as set forth in claim 16, wherein said pre-combustion chamber and said main combustion chambers are coaxially disposed with respect to each other.

21. The combustion chamber system as set forth in claim 16, wherein an end wall of said main combustion chamber is provided with an exhaust port for exhausting combustion products toward a member upon which work is to be performed.

22. The combustion chamber system as set forth in claim 16, wherein a combustion control wall, having an aperture defined therein, is interposed between and separates said pre-combustion chamber and said main combustion chamber.

23. The combustion chamber system as set forth in claim 16, wherein said pre-combustion chamber comprising a plurality of pre-combustion chamber sections fluidically connected to each other comprises a first radially inner cylindrical member, a second radially outer cylindrical member, an axially oriented partition wall for separating opposite ends of said pre-combustion chamber sections, and at least one radially oriented partition wall for dividing said pre-combustion chamber into said plurality of pre-combustion sections.

24. The combustion chamber system as set forth in claim 23, wherein said pre-combustion chamber comprising said plurality of pre-combustion chamber sections fluidically connected together comprises a two-stage axially stacked annular array.

25. The combustion chamber system as set forth in claim 24, wherein said two-stage axially stacked annular array pre-combustion chamber comprises:

a first annular pre-combustion chamber section defined between said radially inner and radially outer cylindrical members and having a first end portion disposed at a predetermined circumferential location with respect to said axis, an igniter disposed within said first end portion of said first annular pre-combustion chamber section, and an annular flow path which extends circumferentially from said first end portion to a second end portion which is disposed at a predetermined circumferential location which is disposed adjacent to said first predetermined circumferential location at which said first end portion is located;

a second annular pre-combustion chamber section defined between said radially inner and radially outer cylindrical members and having a first end portion disposed at a predetermined circumferential location with respect to said axis which is substantially axially aligned with said second end portion of said first annual pre-combustion chamber section, and an annular flow path which extends circumferentially from said first end portion of said second annular pre-combustion chamber section to a second end portion which is disposed at a predetermined circumferential location which is disposed adjacent to said first end portion of said second annular pre-combustion chamber section is located, and which is fluidically connected to said main combustion chamber; and an axially oriented port fluidically interconnecting said second end portion of said first annular pre-combustion chamber section with said first end portion of said second annular pre-combustion chamber section such that said first and second annular pre-combustion chamber sections are fluidically connected together.

26. The combustion chamber system as set forth in claim 23, wherein said pre-combustion chamber comprising said plurality of pre-combustion chamber section fluidically connected together comprises a three-stage axially stacked annular array.

27. The combustion chamber system as set forth in claim 26, wherein said three-stage axially stacked annular array pre-combustion chamber comprises:

a first annular pre-combustion chamber section defined between said radially inner and radially outer cylindrical members and having a first end portion disposed at a predetermined circumferential location with respect to said axis, an igniter disposed within said first end portion of said first annular pre-combustion chamber section, and an annular flow path which extend circumferentially from said first end portion to a second end portion with is disposed at a predetermine circumferential location which is disposed adjacent to said first predetermined circumferential location at which said first end portion is located;

a second annular pre-combustion chamber section defined between said radially inner and radially outer cylindrical members and having a first end portion disposed at a predetermined circumferential location with respect to said axis which is substantially axially aligned with said second end portion of said first annular pre-combustion chamber section, and an annular flow path which extends circumferentially from said first end portion of said second annular pre-combustion chamber section to a second end portion which is disposed at a predetermined circumferential location which is disposed adjacent to said first predetermined circumferential location at which said first end portion of said second annular pre-combustion chamber section is located;

a first axially oriented port fluidically interconnecting said second end portion of said first annular pre-combustion chamber section with said first end portion of said second annular pre-combustion chamber section such that said first and second annular pre-combustion chamber sections are fluidically connected together;

a third annular pre-combustion chamber section defined between said radially inner and radially outer cylindrical members and fluidically connected to said main combustion chamber; and a second axially oriented port fluidically interconnecting said second end portion of said second annular pre-combustion chamber section with said third annular pre-combustion chamber section such that said second and third annular pre-combustion chamber sections are fluidically connected together.

28. The combustion chamber system as set forth in claim 27, wherein said first annular pre-combustion chamber section comprises an uppermost one of said plurality of pre-combustion chamber sections such that the combustion process within said plurality of pre-combustion chamber sections proceeds axially downwardly.

29. The combustion chamber system as set forth in claim 27, wherein said first annular pre-combustion chamber section comprises a lowermost one of said plurality of pre-combustion chamber sections such that the combustion process within said plurality of pre-combustion chamber sections proceeds axially upwardly.

30. A combustion chamber system, comprising:

a pre-combustion chamber comprising a first end wall, a second end wall disposed opposite said first end wall such that the distance defined between said first and second end walls defines the length of said pre-combustion chamber, a first side wall, and a second side-wall disposed opposite said first side wall such that the distance defined between said first and second side walls defines the width of said pre-combustion chamber, wherein said length of said pre-combustion chamber is substantially greater than said width of said pre-combustion chamber; and said pre-combustion chamber comprises at least two sections wherein a first one of said at least two sections is disposed in a nested manner with respect to a second one of said at least two sections;

a main combustion chamber fluidically connected to said pre-combustion chamber; and an ignition device operatively associated with said pre-combustion chamber so as to initiate combustion of a combustible mixture within said pre-combustion chamber.

31. The combustion chamber system as set forth in claim 30, wherein the aspect ratio of said pre-combustion chamber, defined as the ratio of said length of said pre-combustion chamber to said length of said pre-combustion chamber, is at least 2:1.

32. The combustion chamber as set forth in claim 31, wherein the aspect ratio of said pre-combustion chamber is within the range of 4:1 to 16:1.

33. The combustion chamber as set forth in claim 31, wherein the aspect ratio is preferably 10:1.

34. The combustion chamber system as set forth in claim 30, wherein a first section of said two sections of said pre-combustion chamber is fluidically connected in series to a second section of said two sections of said pre-combustion chamber, and said second section of said two sections of said pre-combustion chamber is fluidically connected in series to said main combustion chamber.

35. The combustion chamber system as set forth in claim 34, wherein said first section of said at least two sections of said pre-combustion chamber surrounds said second section of said at least two sections of said pre-combustion chamber.

36. The combustion chamber system as set forth in claim 34, wherein said first section of said at least two sections is disposed concentrically within said second section of said at least two sections of said pre-combustion chamber.

37. The combustion chamber system as set forth in claim 30, wherein said main combustion chamber is disposed within a plane axially separated from said plane within which said pre-combustion chamber is disposed.

38. The combustion chamber system as set forth in claim 30, wherein said at least two sections of said pre-combustion chamber are curved.

39. The combustion chamber system as set forth in claim 38 wherein said at least two curved sections of said pre-combustion chamber are coaxially aligned with respect to each other.

40. The combustion chamber system as set forth in claim 38, wherein said at least two curved sections of said pre-combustion chamber are disposed within a common plane.

41. The combustion chamber system as set forth in claim 30, wherein said ignition device is operatively connected to a first end portion of said first one of said two sections of said pre-combustion chamber, a second end portion of said first one of said two sections of said pre-combustion chamber is fluidically connected to a first end portion of said second one of said two sections of said pre-combustion chamber, a second end portion of said second one of said two sections of said pre-combustion chamber is fluidically connected to said main combustion chamber, said first one of said two sections of said pre-combustion chamber surrounds said second one of said two sections of said pre-combustion chamber.

42. The combustion chamber system set as set forth in claim 30, wherein said ignition device is operatively connected to a first end portion of said first one of said two sections of said pre-combustion chamber, a second end portion of said first one of said two sections of said pre-combustion chamber is fluidically connected to a first end portion of said second one of said two sections of said pre-combustion chamber, a second end portion of said second one of said two sections of said pre-combustion chamber is fluidically connected to said main combustion chamber, said first one of said two sections of said pre-combustion chamber is disposed concentrically within said second one of said two sections of said pre-combustion chamber.

43. The combustion chamber system as set forth in claim 30, wherein said at least two sections of said pre-combustion chamber comprise three sections comprising a three-stage pre-combustion chamber.

44. The combustion chamber system as set forth in claim 43, wherein a first one of said three sections of said pre-combustion chamber is fluidically connected in series to a second one of said three sections of said pre-combustion chamber, and said second one of said three sections of said pre-combustion chamber is fluidically connected in series to a third one of said three sections of said pre-combustion chamber.

45. The combustion chamber system as set forth in claim 43, wherein said ignition device is operatively connected to a first end portion of said first one of said three sections of said pre-combustion chamber, a second end portion of said first one of said three sections of said pre-combustion chamber is fluidically connected to a first end portion of said second one of said three sections of said pre-combustion chamber, a second end portion of said second one of said three sections of said pre-combustion chamber is fluidically connected to a first end portion of said third one of said three sections of said pre-combustion chamber, a second end portion of said third one of said three sections of said pre-combustion chamber is fluidically connected to said main combustion chamber, said first one of said three sections of said pre-combustion chamber surrounds said second one of said three sections of said pre-combustion chamber, and said second one of said three sections of said pre-combustion chamber surrounds said third one of said three sections of said pre-combustion chamber.

46. The combustion chamber system as set forth in claim 43, wherein said ignition device is operatively connected to a first end portion of said first one of said three sections of said pre-combustion chamber, as second end portion of said first one of said three sections of said pre-combustion chamber is fluidically connected to a first end portion of said second one of said three sections of said pre-combustion chamber, a second end portion of said second one of three sections of said pre-combustion chamber is fluidically connected to a first end portion of said third one of said three sections of said pre-combustion chamber, a second end portion of said third one of said three sections of said pre-combustion chamber is fluidically connection to said main combustion chamber, said first one of said three sections of said pre-combustion chamber is disposed concentrically within said second one of said three sections of said pre-combustion chamber, and said second one of said three sections of said pre-combustion chamber is disposed concentrically within said third one of said three sections of said pre-combustion chamber.

47. The combustion chamber system as set forth in claim 43, wherein said main combustion chamber is disposed within a plane axially separated from said common plane within which said three section of said pre-combustion chamber are disposed.

48. The combustion chamber system as set forth in claim 30, wherein said main combustion chamber comprises at least two curved sections wherein a first one of said at least two curved sections is disposed in a nested manner with respect to a second one of said at least two curved sections.

49. The combustion chamber system as set forth in claim 48, wherein said at least two curved sections of said main combustion chamber comprise three curved sections comprising a three-stage main combustion chamber.

50. The combustion chamber system as set forth in claim 49, wherein a first end portion of said first one of said three sections of said main combustion chamber is fluidically connected to said second end portion of said third one of said three sections of said pre-combustion chamber, a second end portion of said first one of said three sections of said main combustion chamber is fluidically connected to a first end portion of said second one of said three sections of said main combustion chamber, a second end portion of said second one of said three sections of said main combustion chamber is fluidically connected to a first end portion of a third one of said three sections of said main combustion chamber, and a second end portion of said third one of said three sections of said main combustion chamber is fluidically connected to an exhaust port.

51. The combustion chamber system as set forth in claim 49, wherein said first one of said three sections of said main combustion chamber surrounds said second one of said three sections of said main combustion chamber, and said second one of said three sections of said main combustion chamber surrounds said third one of said three sections of said main combustion chamber.

52. The combustion chamber system as set forth in claim 49, wherein said first one of said three sections of said main combustion chamber is disposed concentrically within said second one of said three sections of said main combustion chamber, and said second one of said three sections of said main combustion chamber is disposed concentrically within said third one of said three sections of said final three sections of said main combustion chamber.

53. A combustion chamber system for use in connection with the driving of a working piston, comprising:

a pre-combustion chamber comprising a first end wall, a second end wall disposed opposite said first end wall such that the distance defined between said first and second end walls defines the length of said pre-combustion chamber, a first side wall, and a second side wall disposed opposite said first side wall such that the distance defined between said first and second side walls defines the width of said pre-combustion chamber, wherein said length of said pre-combustion chamber is substantially greater than said width of said pre-combustion chamber, and said pre-combustion chamber comprises at least two sections wherein a first one of said at least two sections is disposed in a nested manner with respect to a second one of said at least two sections;

a main combustion chamber fluidically connected to said pre-combustion chamber; and an ignition device operatively associated with said pre-combustion chamber so as to initiate combustion of a combustible mixture within said pre-combustion chamber.

54. The combustion chamber system as set forth in claim 53, wherein the aspect ratio of said pre-combustion chamber, defined as the ratio of said length of said pre-combustion chamber to said width of said pre-combustion chamber, is at least 2:1.

55. The combustion chamber system as set forth in claim 53, wherein a first section of said two sections of said pre-combustion chamber is fluidically connected in series to a second section of said two sections of said pre-combustion chamber, and said second section of said two sections of said pre-combustion chamber is fluidically connected in series to said main combustion chamber.

56. The combustion chamber system as set forth in claim 55, wherein said first section of said at least two sections of said pre-combustion chamber surrounds said second section of said at least two sections of said pre-combustion chamber.

57. The combustion chamber system as set forth in claim 55, wherein said first section of said at least two sections is disposed concentrically within said second section of said at least two sections of said pre-combustion chamber.

58. The combustion chamber system as set forth in claim 55, wherein said main combustion chamber is disposed within a plane axially separated from said plane within which said pre-combustion chamber is disposed.

59. The combustion chamber system as set forth in claim 53, wherein said at least two sections of said pre-combustion chamber are curved.

60. The combustion chamber system as set forth in claim 59, wherein said at least two curved sections of said pre-combustion chamber are coaxially aligned with respect to each other.

61. The combustion chamber system as set forth in claim 59, wherein said at least two curved sections of said pre-combustion chamber are disposed within a common plane.

62. A method of initiating combustion in a combustion system of a spark-ignition linear engine comprising steps of:

pre-establishing mixtures of ignitable fuel and air within both a pre-combustion chamber and a main combustion chamber;

igniting the pre-established mixture of fuel and air at one end of the pre-combustion chamber producing an organized flame front separating burned from unburned portions of the pre-established mixture of fuel and air within the pre-combustion chamber;

propagating the flame front along a length of the pre-combustion chamber that exceeds a width of the pre-combustion chamber by an aspect ratio of at least 2 to 1 so that the flame front remains organized while propagating along the length of the pre-combustion chamber;

compressing a remaining portion of the pre-established mixture of unburned fuel and air in advance of the organized flame front so that the remaining mixture of unburned fuel and air within the pre-combustion chamber is discharged into the main combustion chamber in advance of the flame front; and initiating combustion of the pre-established mixture of fuel and air within the main combustion chamber together with the remaining mixture of unburned fuel and air discharged from the pre-combustion chamber into the main combustion chamber upon introduction of the propagating flame front into the main combustion chamber.

63. The method of claim 62 in which the step of compressing the remaining mixture of unburned fuel and air in advance of the flame front includes compressing the mixture of fuel and air established within the main combustion chamber by the discharge of the remaining mixture of unburned fuel and air from the pre-combustion chamber into the main combustion chamber.

64. The method of claim 62 in which the step of propagating includes propagating the flame front along the length of the pre-combustion chamber that exceeds the width of the pre-combustion chamber by an aspect ratio of between 4 to 1 and 16 to 1.

65. The method of claim 62 including a further step of preventing back flow of burned fuel and air from the main combustion chamber to the pre-combustion chamber following the initiation of combustion within the main combustion chamber.

66. The method of claim 62 including a further step of driving a working piston exposed to the main combustion chamber along an axis that is substantially perpendicular to a direction of the flame front propagation along the length of the pre-combustion chamber.

67. The method of claim 62 including a further step of driving a working piston exposed to the main combustion chamber along an axis that is substantially parallel to a direction of the flame front propagation along the length of the pre-combustion chamber.

68. The method of claim 62 in which the step of propagating the flame front includes propagating the flame front along a curved section of the length of the pre-combustion chamber.

69. The method of claim 68 including a further step of increasing a propagating speed of the flame front through the curved section of the pre-combustion chamber.

70. The method of claim 62 in which the discharge of unburned fuel and air into the main combustion chamber raises pressure of the fuel and air within the main combustion chamber in advance of the step of initiating combustion within the main combustion chamber.

71. The method of claim 70 in which the step of compressing includes discharging the mixture of unburned fuel and air through a check valve into the main combustion chamber.

72. The method of claim 71 including an additional step of closing the check valve accompanying the initiation of combustion within the combustion chamber.

73. The method of claim 72 in which the check valve is closed by pressure within the main combustion chamber exceeding pressure within the pre-combustion chamber associated with the initiation of combustion within the main combustion chamber.

74. A combustion system of a spark-ignition linear engine comprising:

a pre-combustion chamber having a length extending a distance between an ignition end and a discharge end and a width being an average distance separating side walls that extend between an ignition end and a discharge end of the pre-combustion chamber;

a main combustion chamber connected to the discharge end of the pre-combustion chamber;

both the pre-combustion chamber and the main combustion chamber being adapted to receive a pre-established mixture of fuel and air in advance of an ignition cycle;

a spark igniter located at the ignition end of the pre-combustion chamber that ignites the pre-established mixture of fuel and air at the ignition end of the pre-combustion chamber producing an organized flame front between the side walls separating burned from unburned portions of the pre-established mixture of fuel and air within the pre-combustion chamber;

the length of the pre-combustion chamber exceeding the width of the pre-combustion chamber by an aspect ratio of at least 2 to 1 supporting propagation of the organized flame front along the length of the pre-combustion chamber; and a check valve located at the discharge end of the pre-combustion chamber that allows passage of a remaining portion of the pre-established mixture of fuel and air pushed by the flame front from the pre-combustion chamber into the main combustion chamber but limits passage of burned fuel and air from the main combustion chamber into the pre-combustion chamber during combustion in the main combustion chamber.

75. The combustion system of claim 74 in which the pre-combustion chamber is generally smooth and free of discontinuities that would disrupt the organization of the flame front propagating along the length of the pre-combustion chamber.

76. The combustion system of claim 74 in which the length of the pre-combustion chamber exceeds the width of the pre-combustion chamber by an aspect ratio of between 4 to 1 and 16 to 1 supporting propagation of the organized flame front along the length of the pre-combustion chamber.

77. The combustion system of claim 74 in which the length of the pre-combustion chamber exceeds the width of the pre-combustion chamber by an aspect ratio of at least 10 to 1 supporting propagation of the organized flame front along the length of the pre-combustion chamber.

78. The combustion system of claim 74 in which the pre-combustion chamber and the main combustion chamber have approximately equal volumes.

79. The combustion system of claim 74 in which the main combustion chamber is arranged to drive a working piston along a axis of reciprocation that is substantially perpendicular to a direction of the flame front propagation along the length of the pre-combustion chamber.

80. The combustion system of claim 74 in which the main combustion chamber is arranged to drive a working piston along a axis of reciprocation that is substantially parallel to a direction of the flame front propagation along the length of the pre-combustion chamber.

81. The combustion system of claim 74 in which the pre-combustion chamber includes a lengthwise curved section that increases a propagating speed of the flame front along the length of the pre-combustion chamber.

82. The combustion system of claim 81 in which the lengthwise curved section is curved through at least 270 degrees.

83. The combustion system of claim 74 in which the pre-combustion chamber includes a plurality of sections arranged in series, and at least one of those sections is curved lengthwise.

* * * * *